(No Model.)
J. BATH.
CALIPERS.
No. 499,199. Patented June 13, 1893.
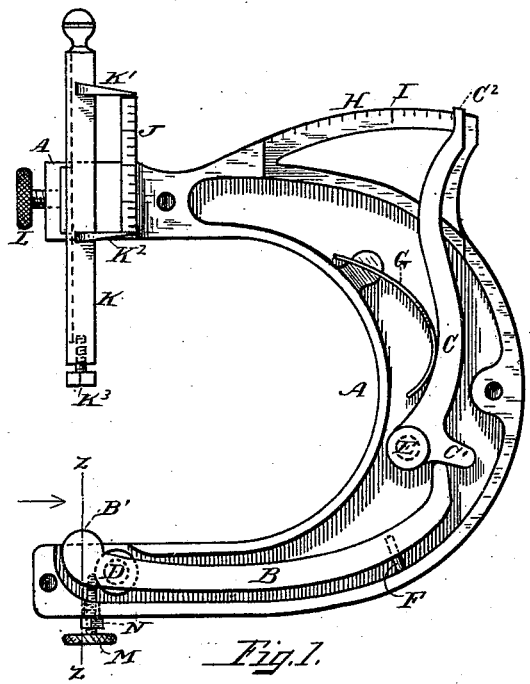
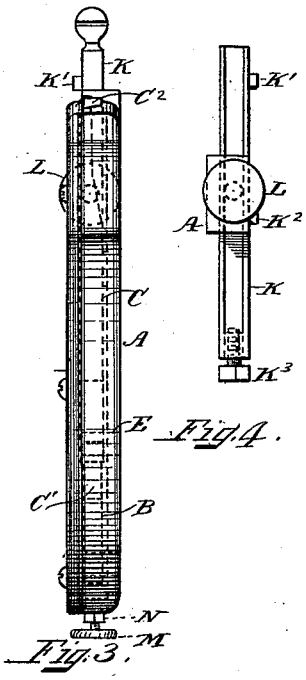
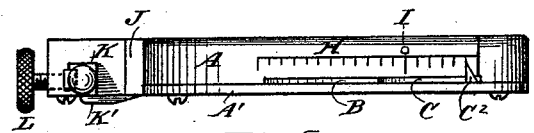
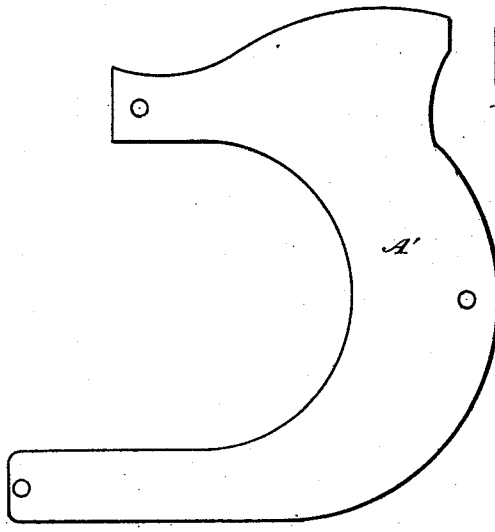
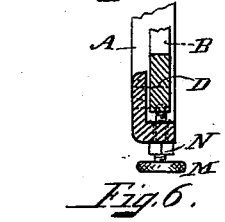
Witnesses:
John Q. Adams
Ralph W. E. Hopper
Inventor:
John Bath
per Eugene Humphrey
his atty.

UNITED STATES PATENT OFFICE.

JOHN BATH, OF HYDE PARK, MASSACHUSETTS.

CALIPERS.

SPECIFICATION forming part of Letters Patent No. 499,199, dated June 13, 1893.

Application filed February 10, 1893. Serial No. 461,750. (No model.)

*To all whom it may concern:*

Be it known that I, JOHN BATH, of Hyde Park, in the county of Norfolk and State of Massachusetts, have invented a new and useful Improvement in Calipers, which will, in connection with the accompanying drawings, be hereinafter fully described, and specifically defined in the appended claims.

The object of my invention is to furnish a convenient measuring tool by which the diameter or thickness of a piece of work may be positively gaged; or the variation from the required size, either larger or smaller, be readily measured and clearly indicated within one-thousandth of an inch or less. And the invention consists in certain novel devices and combinations of mechanism hereinafter fully described and pointed out in the appended claims.

In the drawings Figure 1 is a side elevation of calipers embodying my invention with the face-plate removed to show the incased parts. Fig. 2 is a view of the face-plate detached. Fig. 3 is a rear elevation of the calipers. Fig. 4 is a front elevation of the upper portion of the calipers. Fig. 5 is a top plan of the calipers. Fig. 6 is a section as on line $z, z$ Fig. 1, and as viewed from the left of said line. Fig. 7 is a side view of the lever-spring shown edgewise in Fig. 1.

The calipers shown are composed of a hollow, bow-shaped body A, in which are incased two levers B and C; lever B being pivoted in the hollow of the body at D and lever C at E; the face-plate A' being removed from Fig. 1 to show these levers in place. The arm B' of lever B turns and projects upward through the case and constitutes one of the measuring points of the calipers, and is a movable or yielding point for purposes which will be explained. This short arm of lever B is one-tenth of the length of its longer arm which is always in contact with the short arm C' of the indicating lever C. And this short arm C' is also one-tenth of the length of the longer arm of lever C. A stop-pin F inserted in the long arm of lever B, as shown, rests against the interior wall of the casing and limits the movement of the lever in that direction (except when it is otherwise controlled as hereinafter described), and also the projection of the arm B' above the case and into the space where bodies are admitted between the measuring points of the calipers. Lever B is held in the last named position of rest by the short arm C' which is forced into contact with it by a spring G, which is secured at one end in the hollow of the casing while its free end bears with elastic pressure against the long arm of lever C. There is formed upon or secured to the top of the bow-shaped frame a curved scale H, which is graduated in divisions of one-tenth of an inch; and each one of these divisions, by reason of the multiplied movement of B' at the pointer $C^2$ through levers B and C, represents a movement of B' of only one-thousandth of an inch. A zero mark I on scale H indicates the point of agreement between this and the measuring scale J; or, in other words, the point at which the indicator $C^2$ will stand when point B' stands at the exact distance from its counter-point $K^3$, which is adjustably threaded into the sliding bar K, to compensate for wear, that is indicated on the measuring scale J. The adjustable sliding bar K, which is fitted to slide in a groove in one end of the bow-shaped body, as shown, and is secured in any desired position by a screw L, carries two pointers K' and $K^2$, which pass up and down with the bar and along the face of the measuring scale J secured to the caliper body adjacent to said bar.

By the use of two pointers attached to the bar and arranged as shown, I am able to measure two inches or any fraction thereof by a single fixed one inch scale.

The calipers as shown in the drawings, and which may be made larger or smaller, have a measuring span of two inches; and the scale J represents one inch in length, or one half the span of the calipers, and may be graduated or marked off into divisions as fine as can be easily read at sight by the workman using the tool.

As shown in Fig. 1, the calipers are set to gage or measure a piece of work one inch in diameter or thickness, and is so indicated by the pointer $K^2$ on the scale, it having passed down with the bar the full length of the scale. Now the true distance between $K^3$ and B' should be one inch to accord with the indication on scale J; but B' projects upward into the two inch space which the scale measures, and the actual distance between it and $K^3$ is less than that indicated on scale J to the extent of such upward projection, and consequently if a piece of work measuring exactly one inch were placed between said caliper points, B′ would be depressed and would bring the indicator point C² to the zero mark I on scale H; and when the work should be removed from between the caliper points then the levers would react under the force of spring G to a limited extent and assume their former normal positions with pointer C² five points to the right from the zero mark I, thus indicating a constant variation of five thousandths of an inch from, and less than, the true measure indicated on scale J, as pointer C² has always come to zero to agree with scale J. If bar K is set to a certain measure indicated on scale J, be it any size within the range of two inches, and the piece calipered is from one to five thousandths of an inch less in diameter or thickness than the measure indicated, then pointer C² will indicate on scale H the true size of the piece by stopping at a corresponding distance from the zero mark, which if one-tenth would indicate one-thousandth of an inch less than the size required. And it will indicate in the same manner any excess over the scale measure by carrying the indicator C² beyond and to the left of the zero mark to the extent of such excess multiplied by one hundred. By thus having point B′ movable and the degree of its movement indicated by a hundred-fold greater movement of the pointer C² along the scale H, a very slight variation either way, larger or smaller, from the required size according to the caliper gage J, may be readily detected and measured, and fine, close work in turning or finishing be greatly facilitated.

If a piece of turned work is not true, its circumferential variation from a true circle may be readily detected by the use of my calipers; or if it is eccentric the degree of eccentricity may be thereby readily discovered and measured. Also if a piece of work is required to be of a certain taper these calipers will enable the workman to readily determine the degree or inclination of the taper. When it is desired to have the calipers positively adjusted to gage or measure a given size as indicated on scale J; or to measure a slight excess over such indicated size, then screw M which passes freely through the case and is threaded into arm B′ of lever B, as shown, may be drawn down moving thereby B′ to the required position relatively to point K³, which will be indicated by pointer C² coming to zero on scale H. Then this adjustment may be secured by turning the nut N, which is threaded onto screw M between its head and the outer wall of the casing, against the casing where it counteracts the force of spring G and holds the parts in adjustment. Now if the piece calipered exceeds the size indicated on scale J, when the caliper points are pressed upon the same, point B′ will be forced farther backward against the resistance of spring G, and pointer C² will be thereby carried past the zero mark, and such excess of thickness will be indicated on the multiplied scale H; and if desired, point B′ may be held to the last position by turning the check nut N against the case and thus make the adjustment of the calipers positive as to the size indicated in excess on scale H. And by turning the nut N back against the head of screw M the lever B will be released from all control of the screw. When the lever B is thus locked or adjusted to gage a piece of work which differs slightly from the size indicated on the measuring scale J, the scale H becomes a differential indicator showing when read in connection with scale J, the size of the piece in accordance with scale J minus or plus the variation shown by scale H, as its index point may stand to the right or left of the zero mark thereon.

I claim—

1. A caliper embodying the combination of an adjustable measuring bar K arranged to slide in a groove in the body of the caliper; a scale J fixed upon the body adjacent to said bar and by which the bar is adjusted so as to indicate on the scale the measurement to which the caliper is set; a lever B pivoted to the body and so arranged that its short arm presents to bar K a yielding counterpoint B′; a lever C actuated by the long arm of lever B so that the consequent movement of the long arm of lever C is a multiplied movement of the point B′; a scale H so arranged upon the body of the caliper that such multiplied movement is indicated thereon by a pointer on lever C; and a counteracting spring G operating against lever C; all as and for the purposes specified.

2. A caliper embodying the combination of an adjustable bar K; a measuring scale J, which is in length one half the span of the caliper; and two pointers K′ and K² attached to the bar K at a distance apart equal to the length of the scale; and a counterpoint B′ whose true measuring distance from point K³ on bar K, as the bar may be variously adjusted, will be indicated on said scale by the pointers: whereby the full measuring capacity of the caliper may be indicated on a scale half its span in length, substantially as specified.

3. A caliper embodying the combination of multiplying levers B and C; scale H; spring G; screw M; and nut N; constructed and arranged to operate together and relatively to each other substantially as described: whereby one measuring point, B′, may be yieldingly adjusted against the force of the spring, and its position and movement indicated on scale H, all as and for the purposes specified.

4. A caliper embodying the combination of an adjustable but unyielding measuring point K³; a scale J upon which is indicated the position of point K³ relative to the true position of its counterpoint; an adjustable but yielding counterpoint B′; and a magnified scale H upon which are indicated the various positions of the counterpoint B' relatively to point K³, through a system of multiplying levers operating together substantially as described, and for the purposes specified.

5. A caliper embodying the combination of an adjustable measuring bar K; a scale J by which the bar is adjusted in a fixed and measured position relatively to the true position of its counterpoint; a movable counterpoint B' arranged to be normally at a certain variation from its true position indicated on scale J; and a magnified scale H upon which the extent of such variation of point B', and its true position, are indicated by suitable means, substantially as and for the purposes specified.

6. The combination of the hollow case or body A, provided with a detachable face-plate A', bar K fitted to slide in a groove in the upper end of body A, and carrying pointers K' K² and provided with an adjustable wearing point K³; scale J attached to body A adjacent to bar K; screw L for holding the bar in adjustment; lever B pivoted in the hollow of the case, and having a short arm B' projecting upward through the case; screw M passing through case A and threaded into arm B' of lever B, and provided with a nut N which turns on the screw against the outside of case A; lever C pivoted in the hollow of the case and having an arm C' and a pointer C²; spring G secured at one end in the hollow of the case and which by the action of its free end forces arm C' into contact with the end of lever B; and scale H mounted upon the top of case A; all operating together in the manner and for the purposes specified.

JOHN BATH.

Witnesses:
EUGENE HUMPHREY,
RALPH W. E. HOPPER.